United States Patent [10] Patent No.: US 11,469,863 B2
Choi et al. [45] Date of Patent: Oct. 11, 2022

(54) METHOD AND DEVICE FOR TRANSMITTING/RECEIVING DATA IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 17/265,940

(22) PCT Filed: Aug. 9, 2019

(86) PCT No.: PCT/KR2019/010085
§ 371 (c)(1),
(2) Date: Feb. 4, 2021

(87) PCT Pub. No.: WO2020/032694
PCT Pub. Date: Feb. 13, 2020

(65) Prior Publication Data
US 2021/0306112 A1 Sep. 30, 2021

(30) Foreign Application Priority Data
Aug. 9, 2018 (KR) .......................... 10-2018-0093334

(51) Int. Cl.
*H04W 4/00* (2018.01)
*H04L 1/18* (2006.01)
(Continued)

(52) U.S. Cl.
CPC .......... *H04L 1/1887* (2013.01); *H04L 1/0025* (2013.01); *H04L 27/2607* (2013.01); *H04W 88/14* (2013.01)

(58) Field of Classification Search
None
See application file for complete search history.

(56) References Cited

U.S. PATENT DOCUMENTS 10,595,311 B2 * 3/2020 Gupta ............... H04W 72/0413
2017/0006499 A1 1/2017 Hampel et al.
(Continued)

FOREIGN PATENT DOCUMENTS

EP 2 822 202 B1 1/2018

OTHER PUBLICATIONS

Nokia et al.; IAB Synchronization; 3GPP TSG RAN WG1 Meeting 93; R1-1806664; May 21-25, 2018; Busan, Korea.
(Continued)

*Primary Examiner* — Gerald A Smarth
(74) *Attorney, Agent, or Firm* — Jefferson IP Law, LLP

(57) ABSTRACT

The disclosure relates to a method and device for transmitting or receiving data in a wireless communication system. A method, performed by an integrated access and backhaul (IAB) node, for transmitting or receiving data in a wireless communication system includes, in case of performing a transition between a transmission mode and a reception mode, determining, based on a priority, whether to complete a transmission or reception of first data in a guard interval, and controlling a start of reception or transmission of second data based on the guard interval and a time point at which the transmission or reception of the first data is completed, and wherein the guard interval includes a time at which a transmission or reception interval of the first data and a transmission or reception interval of the second data overlap (Continued)

each other and a time for the transition between the transmission mode and the reception mode.

15 Claims, 12 Drawing Sheets

(51) Int. Cl.
    *H04L 1/00*         (2006.01)
    *H04L 27/26*       (2006.01)
    *H04W 88/14*      (2009.01)

(56) References Cited

U.S. PATENT DOCUMENTS

2017/0064731 A1    3/2017   Wang et al.
2021/0368481 A1*  11/2021  Jo .................... H04W 72/0413

OTHER PUBLICATIONS

LG Electronics; Discussions on NR IAB support; 3GPP TSG RAN WG1 Meeting #93; R1-1806649; May 21-25, 2018; Busan, Korea.
LG Electronics; Discussions on NR IAB support; 3GPP TSG RAN WG1 Meeting #92bis; R1-1804583; Apr. 16-20, 2018; Sanya, China.
International Search Report with Written Opinion and English translation dated Dec. 3, 2019; International Application No. PCT/KR2019/010085.

* cited by examiner

METHOD AND DEVICE FOR TRANSMITTING/RECEIVING DATA IN WIRELESS COMMUNICATION SYSTEM

TECHNICAL FIELD

The disclosure relates to a method and device for transmitting or receiving data in a wireless communication system.

BACKGROUND ART

To meet the increasing demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' To achieve high data rates, implementation of 5G communication systems in an ultra-high frequency millimeter-wave (mmWave) band (e.g., a 60 GHz band) is being considered. To reduce propagation loss of radio waves and to increase a transmission range of radio waves in the ultra-frequency bands, beamforming, massive multiple-input multiple-output (MIMO), full dimensional MIMO (FD-MIMO), array antenna, analog beamforming, and large-scale antenna techniques are under discussion. In order to improve system networks for 5G communication systems, various technologies have been developed, e.g., evolved small cells, advanced small cells, cloud radio access networks (Cloud-RAN), ultra-dense networks, device-to-device (D2D) communication, wireless backhaul, moving networks, cooperative communication, coordinated multi-points (COMP), and interference cancellation. In addition, in the 5G system, an advanced coding modulation (ACM), e.g., Hybrid FSK and QAM Modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, the Internet is evolving from a human-centered connectivity network where humans generate and consume information to an Internet of Things (IoT) network where distributed entities or things send, receive, and process information without human intervention. Internet of Everything (IoE) technologies combined with IoT, such as big data processing technologies through connection with a cloud server, for example, have also emerged. To implement IoT, various technologies, such as a sensing technology, a wired/wireless communication and network infrastructure, a service interfacing technology, and a security technology are required, and recently, technologies for a sensor network, Machine to Machine (M2M) communication, Machine Type Communication (MTC) for connection between things are being studied. Such an IoT environment may provide intelligent Internet Technology (IT) services that create new values in human life by collecting and analyzing data generated among connected things. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies regarding a sensor network, M2M communication, MTC, etc., are implemented by the 5G communication technologies, such as beamforming, MIMO, array antenna schemes, etc. Even application of a cloud Radio Access Network (cloud RAN) as the aforementioned big data processing technology may be said to be an example of convergence of 5G and IoT technologies.

With the development of the aforementioned technologies and mobile communication systems, various services may be provided, and there is a need for a method for smoothly providing the services.

DESCRIPTION OF EMBODIMENTS

Solution to Problem

The disclosure relates to a method and device for transmitting or receiving data in a wireless communication system. According to an embodiment, a method, performed by an integrated access and backhaul (IAB) node, of transmitting or receiving data in a wireless communication system includes, in case of performing a transition between a transmission mode and a reception mode, determining, based on a priority, whether to complete a transmission or reception of first data in a guard interval, and controlling a start of reception or transmission of second data based on the guard interval and a time point at which the transmission or reception of the first data is completed, wherein the guard interval includes a time at which a transmission or reception interval of the first data and a transmission or reception interval of the second data overlap each other and a time for the transition between the transmission mode and the reception mode.

BEST MODE

Figure 1:
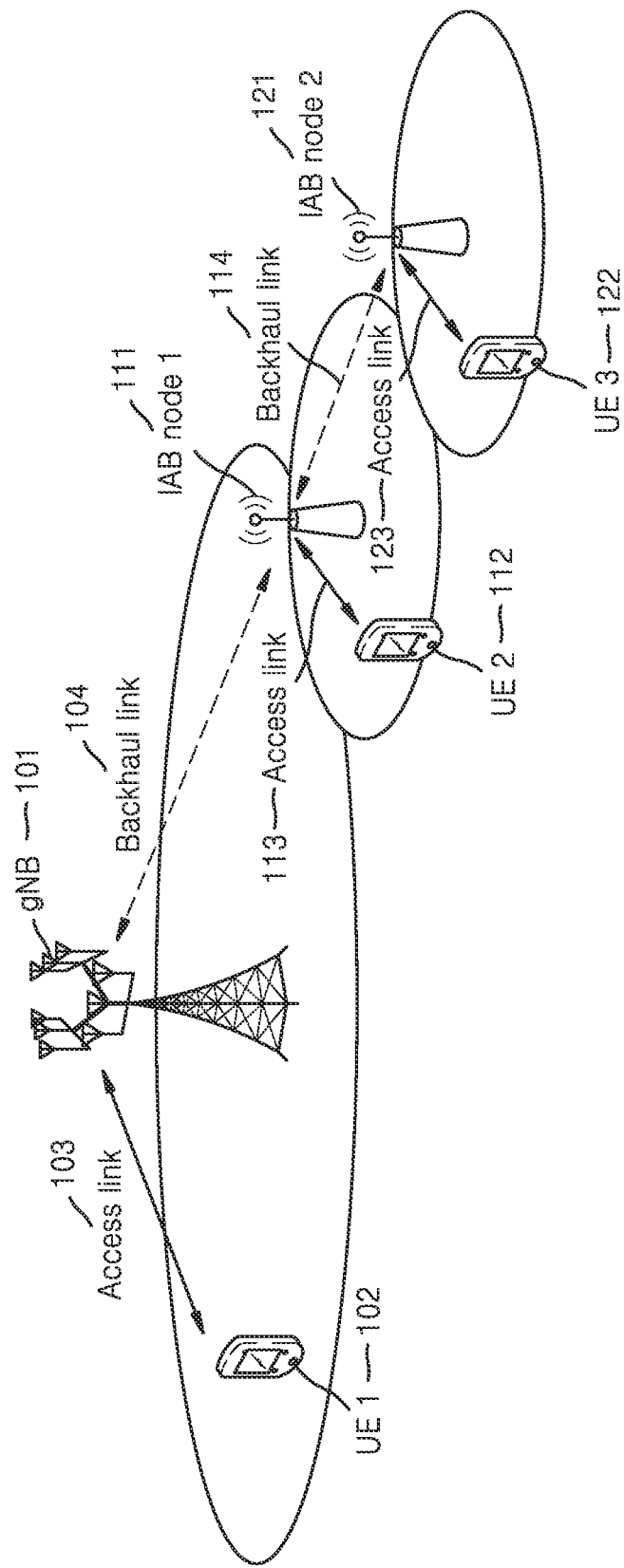
FIG. 1 is a diagram illustrating a communication system in which integrated access and backhaul (IAB) is operated, according to some embodiments.

According to an embodiment of the disclosure, an integrated access and backhaul (IAB) node for transmitting or receiving data in a wireless communication system includes a transceiver configured to operate in a transmission mode or a reception mode, and at least one processor connected to the transceiver and configured to, in case of performing a transition between the transmission mode and the reception mode, determine, based on a priority, whether to complete a transmission or reception of first data in a guard interval, to control a start of reception or transmission of second data based on the guard interval and a time point at which the transmission or reception of the first data is completed, wherein the guard interval includes a time at which a transmission or reception interval of the first data and a transmission or reception interval of the second data overlap each other and a time for the transition between the transmission mode and the reception mode.

The priority may be configured such that the transmission mode takes priority over the reception mode, and the at least one processor may be configured to determine, according to the priority, to complete the reception of the first data before a start of the guard interval, except for some symbols of the first data corresponding to the guard interval from among the first data, and after a time for transition from the reception mode to the transmission mode from a time point at which the reception of the first data is completed, to control the start of the transmission of the second data.

The priority may be configured such that the reception mode takes priority over the transmission mode, and the at least one processor may be configured to determine to complete transmission of the first data, according to the priority, and control a start of reception of other symbols of the second data except for some symbols of the second data corresponding to the guard interval from among the second data.

The priority may be configured such that the reception mode takes priority over the transmission mode, and the at least one processor may be configured to determine to complete the reception of the first data, according to the priority, and control a start of transmission of other symbols of the second data except for some symbols of the second data corresponding to the guard interval from among the second data.

The priority may be configured such that the reception mode takes priority over the transmission mode, and the at least one processor may be configured to determine, according to the priority, to complete the transmission of the first data before a start of the guard interval, except for some symbols of the first data corresponding to the guard interval from among the first data, and, after a time for transition from the reception mode to the transmission mode from a time point at which the transmission of the first data is completed, control the start of the reception of the second data.

The first data and the second data may be transmitted or received via a backhaul link or an access link.

According to an embodiment of the disclosure, a method, performed by an integrated access and backhaul (IAB) node, of transmitting or receiving data in a wireless communication system includes, in case of performing a transition between a transmission mode and a reception mode, determining, based on a priority, whether to complete a transmission or reception of first data in a guard interval; and controlling a start of reception or transmission of second data based on the guard interval and a time point at which the transmission or reception of the first data is completed, and wherein the guard interval includes a time at which a transmission or reception interval of the first data and a transmission or reception interval of the second data overlap each other and a time for the transition between the transmission mode and the reception mode.

The priority may be configured such that the transmission mode takes priority over the reception mode, and the determining of whether to complete the transmission or reception of the first data in the guard interval may include determining, according to the priority, to complete the reception of the first data before a start of the guard interval, except for some symbols of the first data corresponding to the guard interval from among the first data, and the controlling of the start of the reception or transmission of the second data may include, after a time for transition from the reception mode to the transmission mode from a time point at which the reception of the first data is completed, controlling the start of the transmission of the second data.

The priority may be configured such that the transmission mode takes priority over the reception mode, the determining of whether to complete the transmission or reception of the first data in the guard interval may include determining to complete the transmission of the first data, according to the priority, and the controlling of the start of the reception or transmission of the second data may include controlling a start of reception of other symbols of the second data except for some symbols of the second data corresponding to the guard interval from among the second data.

The priority may be configured such that the reception mode takes priority over the transmission mode, the determining of whether to complete the transmission or reception of the first data in the guard interval may include determining to complete the reception of the first data, according to the priority, and the controlling of the start of the reception or transmission of the second data may include controlling a start of transmission of other symbols of the second data except for some symbols of the second data corresponding to the guard interval from among the second data.

The priority may be configured such that the reception mode takes priority over the transmission mode, the determining of whether to complete the transmission or reception of the first data in the guard interval may include determining, according to the priority, to complete the transmission of the first data before a start of the guard interval, except for some symbols of the first data corresponding to the guard interval from among the first data, and the controlling of the start of the reception or transmission of the second data may include, after a time for transition from the reception mode to the transmission mode from a time point at which the transmission of the first data is completed, controlling the start of the reception of the second data.

MODE OF DISCLOSURE

Embodiments of the disclosure will be described in detail with reference to accompanying drawings. In the description of the disclosure, when it is determined that a detailed description of related functions or configurations may unnecessarily obscure the subject matter of the disclosure, the detailed description will be omitted. Further, terms, as will be mentioned below, are defined by taking functionalities in the disclosure into account, but may vary depending on practices or intentions of users or operators. Thus, the terms should be defined based on the description throughout the specification.

Advantages and features of one or more embodiments of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-executable or computer-readable memory capable of directing a computer or another programmable data processing apparatus to implement a function in a particular manner, and thus, the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

The term "module" (or sometimes "unit") as used herein refers to a software or hardware component, such as field programmable gate array (FPGA) or application specific integrated circuit (ASIC), which performs some functions. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. In embodiments, the module may include one or more processors.

While describing the disclosure, detailed descriptions of related well-known functions or configurations may be omitted when it is deemed that they may unnecessarily obscure the essence of the disclosure. Embodiments of the disclosure will be described below with reference to the accompanying drawings.

Also, terms for identifying access nodes, terms denoting network entities, terms denoting messages, terms denoting an interface between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the $3^{rd}$ Generation Partnership Project Long Term Evolution (3GPP LTE). However, the disclosure is not limited by such terms and names, and may be equally applied to systems conforming to other standards. In the disclosure, eNode B (eNB) may be interchangeably used with gNode B (gNB) for convenience of explanation. In other words, a base station described as the eNB may represent the gNB. Also, the term "terminal" may refer to other wireless communication devices in addition to mobile phones, narrowband IoT (NB-IoT) devices, and sensors.

Hereinafter, a base station may be an agent performing terminal resource allocation and may be at least one of a gNode B, an eNode B, a Node B, a base station (BS), a radio access unit, a base station controller, or a node on a network. The terminal may include a UE, an MS, a cellular phone, a smartphone, a computer, or a multimedia system capable of performing communication functions. However, the disclosure is not limited to the above example.

Particularly, the disclosure may be applied to 3GPP NR (5G mobile communication standards). Also, the disclosure is applicable to intelligent services (e.g., smart home, smart building, smart city, smart car or connected car, health care, digital education, retail, security, and safety services) based on 5G communication technology and IoT technology. The term "eNB" as used in the disclosure may be used interchangeably with the term "gNB" for convenience of description. In other words, a base station described as the eNB may represent the gNB. Also, the term "terminal" may refer to other wireless communication devices in addition to mobile phones, NB-IoT devices, and sensors.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink and employs single carrier-frequency division multiple access (SC-FDMA) for an uplink. The uplink refers to a radio link for transmitting data or a control signal from a terminal (e.g., a user equipment (UE) or a mobile station (MS)) to a base station (e.g., an evolved Node B (eNB) or a base station (BS)), and the downlink refers to a radio link for transmitting data or a control signal from the base station to the terminal. The multiple access scheme separates data or control information for each user by allocating and operating time-frequency resources on which the data or the control information is carried for each user, so that the time-frequency resources do not overlap each other, that is, so that orthogonality is realized.

As post-LTE systems, 5G (or new radio (NR)) systems may have to support services capable of simultaneously satisfying various requirements because they may have to freely reflect various requirements of users, service providers, and the like. Services considered for the 5G systems include enhanced mobile broadband (eMBB), massive machine-type communication (mMTC), and ultra-reliability low-latency communication (URLLC) services.

The eMBB aims to provide an improved data rate than the data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a base station. Also, the 5G communication system may have to provide an increased user-perceived data rate of a terminal while providing a peak data rate. In order to satisfy such requirements, there is a need for an improvement in various transmission/reception technology including an improved multiple-input multiple-output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the current LTE.

Simultaneously, the mMTC is being considered to support application services such as Internet of Things (IoT) in 5G communication systems. In order to efficiently provide the IoT, the mMTC may require the support for access of large terminals in a cell, improved terminal coverage, improved battery time, reduced terminal cost, and the like. The IoT is connected to various sensors and devices to provide a communication function. Therefore, the IoT needs to support a large number of UEs (for example, 1,000,000 UEs/km$^2$) in a cell. Also, because a terminal supporting the mMTC is likely to be located in a shadow region failing to be covered by the cell, such as the basement of a building, due to the characteristics of the service, it may require wider coverage than other services provided by the 5G communication systems. The terminal supporting the mMTC should be configured as a low-cost terminal and may require a very long battery life time of about 10 years to about 15 years because it is difficult to frequently replace the battery of the terminal.

Finally, the URLLC service is a cellular-based wireless communication service used for a mission-critical purpose. For example, services used for remote control of robots or machinery, industrial automation, unmanned aerial vehicles, remote health care, emergency alerts, and the like may be considered. Thus, the communication provided by the URLLC may have to provide very low latency (ultra-low latency) and very high reliability (ultra-high reliability). For example, a service supporting the URLLC should satisfy an air interface latency of less than 0.5 milliseconds and simultaneously has a requirement for a packet error rate of 10$^{-5}$ or less. Thus, for the service supporting the URLLC, the 5G system should provide a smaller transmit time interval (TTI) than other services and simultaneously may have a design requirement for allocating wide resources in frequency bands in order to secure the reliability of communication links.

The three services of 5G, namely, eMBB, URLLC, and mMTC, may be multiplexed in one system and transmitted. In this case, different transmission/reception techniques and transmission/reception parameters may be used between services in order to satisfy different requirements of the respective services.

In 5G, when a BS transmits or receives data to or from a UE supporting services such as eMBB, URLLC, and mMTC in a band of 6 GHz or higher, especially mmWave, coverage may be limited due to attenuation of the propagation path. The problem of coverage limitation may be solved by closely arranging a plurality of relays between the BS and the propagation path of the UE, but accordingly, the cost problem for installing an optical cable for backhaul connection between relays may be serious.

Therefore, by using a broadband radio frequency resources available in mmWave to transmit or receive backhaul data between relays, instead of installing optical cables between relays, the cost problem of installing optical cables may be solved, and mmWave bands may be used more efficiently. A technology for transmitting or receiving backhaul data to or from a BS using mmWave, and finally transmitting or receiving data to or from a UE through a plurality of relays is called integrated access and backhaul (IAB), and a relay node that transmits or receives data to or from a BS via a wireless backhaul is called an IAB node. When an IAB node transmits or receives backhaul data, the same frequency band may be used to receive data from the BS and transmit data to the UE, and due to the characteristic of the IAB node of receiving data from the UE and transmitting data to the BS, the IAB node may instantly obtain a unidirectional transmission or unidirectional reception characteristic.

Therefore, in order to reduce the transmission/reception latency due to the unidirectional nature of the IAB node and synchronize the transmission and reception time between the IAB nodes, it is necessary to define the data transmission/reception timing between the IAB nodes and between the IAB node and the UE.

Thus, the disclosure defines data transmission/reception timing to/from IAB nodes and provides an option for changing, when an IAB node transmits or receives backhaul data, an RF to transmission or reception due to a unidirectional transmission/reception characteristic of the IAB node, and securing a guard interval necessary for a propagation latency due to a cell radius.

FIG. 1 is a diagram illustrating a communication system in which IAB is operated, according to some embodiments.

In FIG. 1, a gNB 101 may be a normal base station, and will be referred to as a BS or a donor BS in the disclosure. An IAB node 1 111 and an IAB node 2 121 are IAB nodes that transmit or receive backhaul links in an mmWave band. A UE 1 102 may transmit or receive access data to or from the gNB 101 via an access link 103. The IAB node 1 111 may transmit or receive backhaul data to or from the gNB 101 via a backhaul link 104. A UE 2 112 may transmit or receive access data to or from the IAB node 1 111 via an access link 113. The IAB node 2 121 may transmit or receive backhaul data to or from the IAB node 1 111 via a backhaul link 114.

Thus, the IAB node 1 111 is a higher IAB node than the IAB node 2 121. A higher IAB node such as the IAB node 1 111 may be referred to as a parent IAB node. The IAB node 2 121 is a lower IAB node than the IAB node 1 111. A lower IAB node such as the IAB node 2 121 may be referred to as a child IAB node.

A UE 3 122 may transmit or receive access data to or from the IAB node 2 121 via an access link 123.

Next, it will be described with reference to FIG. 2 that, in IAB technology according to some embodiments proposed in the disclosure, a backhaul link between a BS and an IAB node or between an IAB node and another IAB node and an access link between a BS and a UE or between an IAB node and a UE are multiplexed within a radio resource.

Figure 2A:
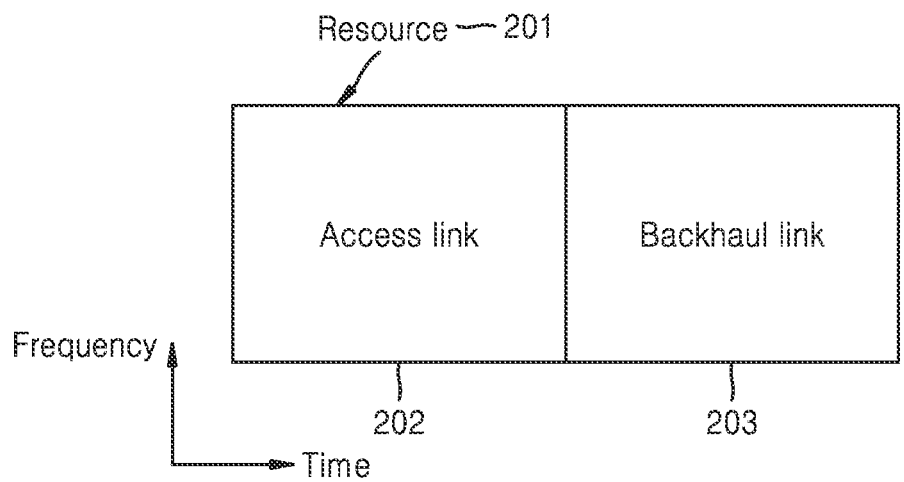
FIGS. 2A and 2B are diagrams illustrating time domain multiplexing and frequency domain multiplexing between an access link and a backhaul link in IAB, according to some embodiments.
Figure 2B:
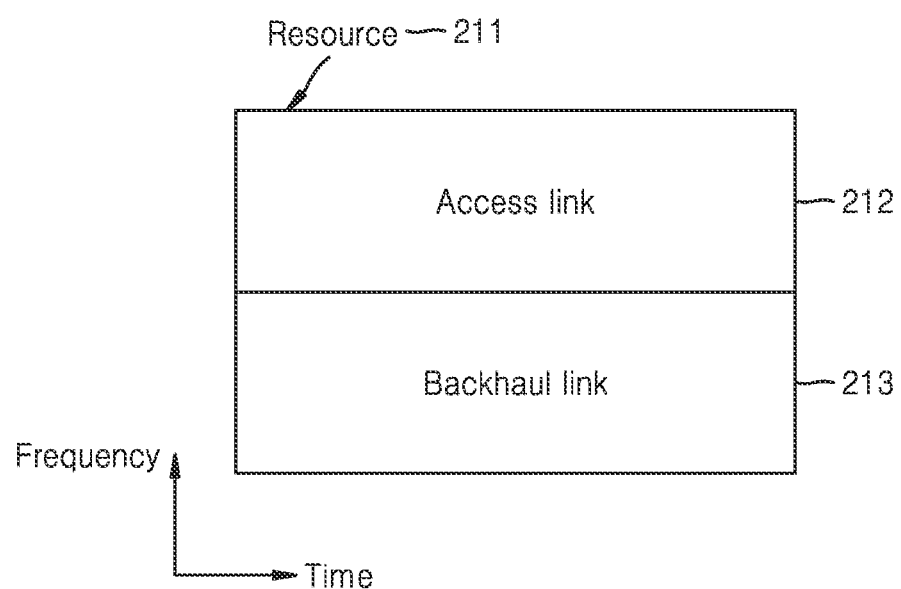

FIGS. 2A and 2B are diagrams illustrating time domain multiplexing and frequency domain multiplexing between an access link and a backhaul link in IAB, according to some embodiments. FIG. 2A is a diagram illustrating multiplexing of an access link and a backhaul link in an IAB in a time domain. FIG. 2B is a diagram illustrating multiplexing of an access link and a backhaul link in an IAB in a frequency domain.

Referring to FIG. 2A, within a resource 201, a backhaul link 203 between a BS and an IAB node or between an IAB node and another IAB node and an access link 202 between a BS and a UE or between an IAB node and a UE is time domain multiplexed (TDM).

Thus, in a time domain where a BS or an IAB node transmits or receives data to or from a UE, the BS and the IAB nodes do not transmit or receive data to or from each other, and in a time domain where the BS transmits or receives data to or from the IAB nodes, the BS or the IAB node does not transmit or receive data to or from the UE.

Referring to FIG. 2B, within a resource 211, a backhaul link 213 between a BS and an IAB node or between an IAB node and another IAB node and an access link 212 between a BS and a UE or between an IAB node and a UE is frequency domain multiplexed (FDM).

Thus, data may be transmitted or received to or from the BS and the IAB nodes in a time domain in which the BS or the IAB node transmits or receives data to or from the UE, but only data transmission in the same direction may be possible due to the unidirectional transmission and reception characteristic of the IAB nodes. In other words, in a time domain in which an IAB node receives data from a UE, the IAB node may only receive backhaul data from another IAB node or the BS. In addition, in a time domain in which an IAB node transmits data to the UE, the IAB node may only transmit backhaul data to another IAB node or the BS.

Although only TDM and FDM are described with reference to FIGS. 2A and 2B, spatial domain multiplexing (SDM) of an access link and a backhaul link may also be possible. Thus, an access link and a backhaul link may be transmitted or received at the same time through SDM, but only data transmission in the same direction may be possible in SDM due to the unidirectional transmission and reception characteristic of the IAB nodes as in FDM of FIG. 2B. In other words, in a time domain in which an IAB node receives data from a UE, the IAB node may only receive backhaul data from another IAB node or the BS. In addition, in a time domain in which an IAB node transmits data to a UE, the IAB node may only transmit backhaul data to another IAB node or the BS.

When an IAB node initially accesses a BS or higher IAB nodes, the IAB node may receive, via system information or an RRC signal, information about which multiplexing scheme among TDM, FDM, and SDM is to be used, or after the initial access, the IAB node may receive the information from the BS or the higher IAB nodes.

Figure 3:
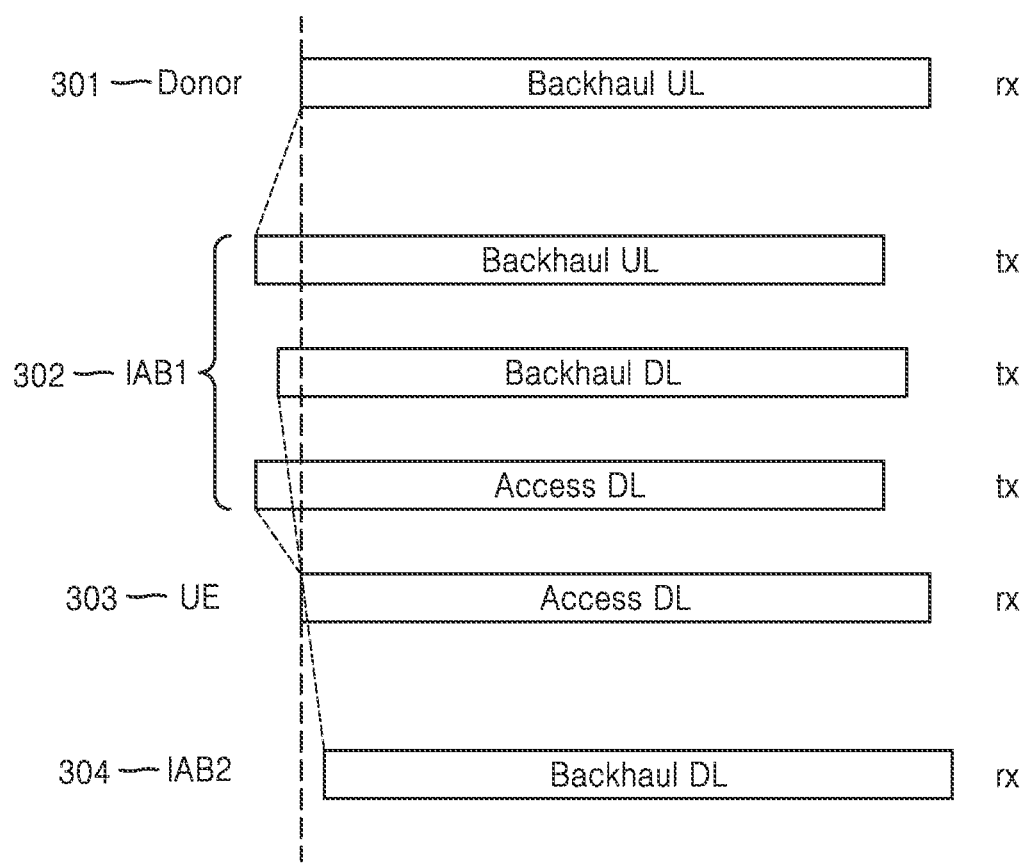
FIG. 3 is a diagram illustrating an example in which there is a discrepancy between transmission and reception timings of access data and backhaul data in IAB, according to some embodiments.

FIG. 3 is a diagram illustrating an example in which there is a discrepancy between transmission and reception timings of access data and backhaul data in IAB, according to some embodiments.

Referring to FIG. 3, an IAB node 1 302 transmits data to a higher donor BS 301 via a backhaul link. In addition, the IAB node 1 302 transmits data to a lower IAB node 2 304 via a backhaul link. At this time, when a start timing at which the IAB node 1 302 transmits data to the donor BS 301 is different from a start timing at which the IAB node 1 302 transmits data to the lower IAB node 2 304, a time interval in which the IAB node 1 302 transmits data via a backhaul link may increase by that timing difference.

Thus, in order to reduce data transmission or reception latency due to an increased time interval for backhaul link data transmission, it may be desirable to synchronize a time point at which the data is transmitted to the donor BS 301 via a backhaul link with a time point at which the data is transmitted to the IAB node 2 304 via a backhaul link.

As described with reference to FIGS. 2A and 2B, in a case where FDM or SDM is performed on a backhaul link and an access link, the IAB node 1 302 may transmit data to a UE 303 via an access link when transmitting data via a backhaul link. Thus, by synchronizing through FDM and SDM a time interval in which the IAB node 1 302 transmits data via a backhaul link with a time interval in which the IAB node 1 transmits data via an access link, a time interval in which the IAB node 1 302 transmits data may be efficiently used, and thus, the saved time may be used to receive data.

Figure 4:
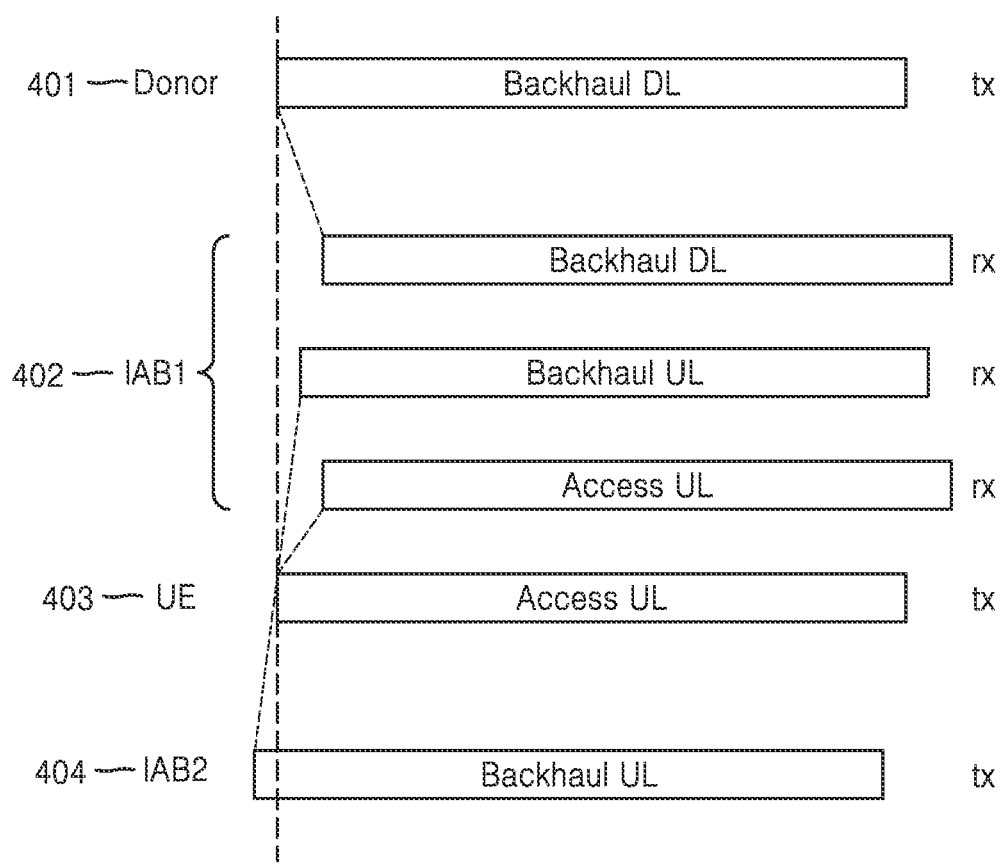
FIG. 4 illustrates an example in which there is a discrepancy between transmission and reception timings of access data and backhaul data in IAB, according to some embodiments.

FIG. 4 is a diagram illustrating an example in which there is a discrepancy between transmission and reception timings of access data and backhaul data in IAB.

Referring to FIG. 4, an IAB node 1 402 receives data from a higher donor BS 401 via a backhaul link. In addition, the IAB node 1 402 may receive data from a lower IAB node 2 404 via a backhaul link. Here, in a case where a start timing at which the donor BS 401 transmits data to the lower IAB node 1 402 via a backhaul link is different from a start timing at which the lower IAB node 2 404 transmits data to the IAB node 1 402 via a backhaul link, a time interval in which the IAB node 1 402 receives data via a backhaul link may increase by the timing difference.

Thus, in order to reduce data transmission and reception latency due to an increased time interval for backhaul link data transmission, it may be desirable to synchronize a time point at which the donor BS 401 transmits data to the IAB node 1 402 via a backhaul link with a time point at which the lower IAB node 2 404 transmits data to the IAB node 1 402 via a backhaul link.

As described with reference to FIGS. 2A and 2B, in a case where FDM or SDM is performed on a backhaul link and an access link, the IAB node 1 402 may receive data via the access link when receiving data via the backhaul link. Thus, by synchronizing a time interval in which the IAB node 1 402 receives data via the backhaul link with a time interval in which the IAB node 1 402 receives data via the access link, a time interval in which the IAB node 1 402 receives data may be efficiently used, and thus, the saved time may be used to receive data.

Figure 5:
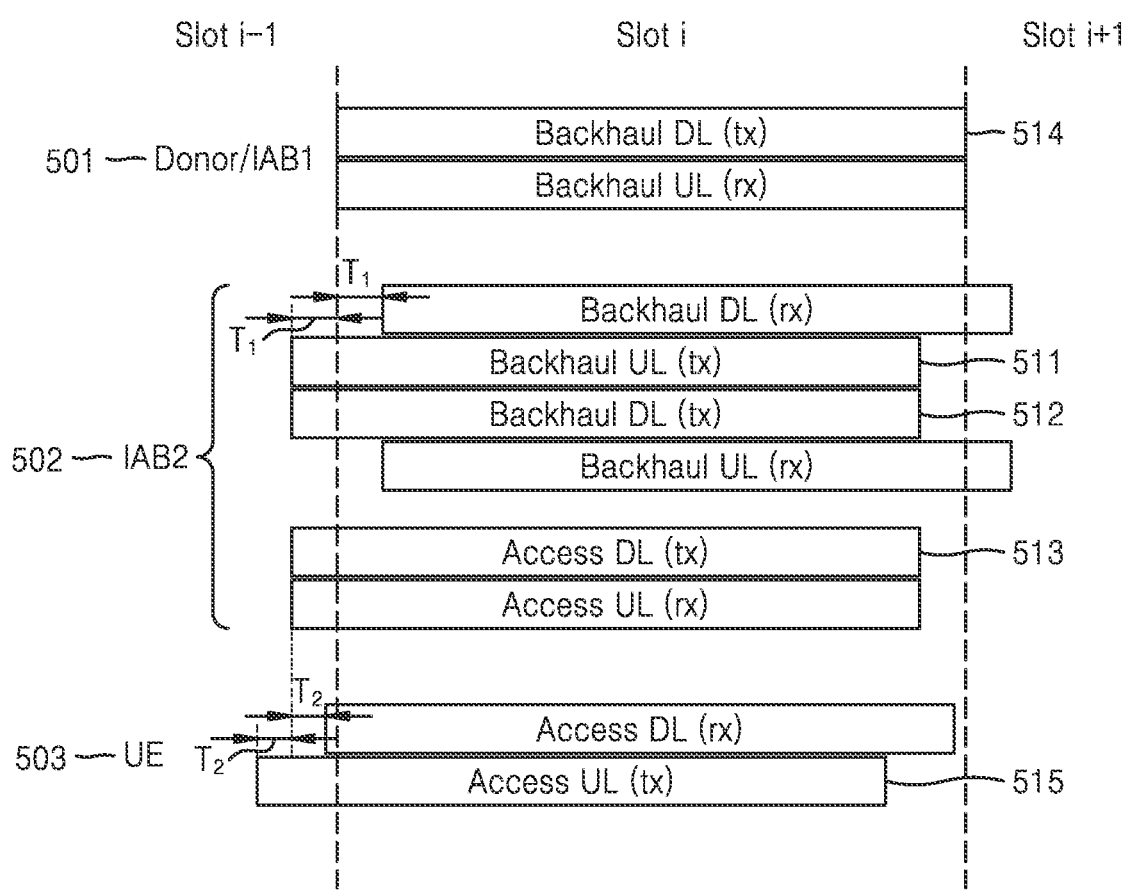
FIG. 5 is a diagram illustrating Embodiment 1 for synchronizing transmission and reception timings of access data and backhaul data in IAB, according to some embodiments.

FIG. 5 is a diagram illustrating Embodiment 1 in which transmission and reception timings of access data and backhaul data are synchronized with each other in IAB, according to some embodiments.

In FIG. 5, descriptions may be provided on the assumption that an access link and a backhaul link are configured by TDM as described with reference to FIG. 2. However, an embodiment of FIG. 5 may also be applied to FDM or SDM.

Referring to FIG. 5, in Embodiment 1, backhaul data transmission time points 511 and 512 in an IAB node 2 502 may be synchronized with an access data transmission time point 513 in the IAB node 2 502. In addition, in Embodiment 1, a backhaul data transmission time point and a backhaul data reception time point of a donor BS/higher IAB node 1 501 may be synchronized with each other.

In Embodiment 1, backhaul data transmission 511 transmitted from the IAB node 2 502 to the donor BS/higher IAB node 1 501 may be received by the donor BS/higher IAB node 1 501 after a propagation delay time of T1, and backhaul data transmission 514 transmitted from the donor BS/higher IAB node 1 501 to the lower IAB node 2 502 may be received by the lower IAB node 2 502 after the propagation delay time of T1. In addition, a UE 503 accessing the IAB node 2 502 may receive access data 513 transmitted from the IAB node 2 502 after a propagation delay time of T2, and the IAB node 2 502 may receive access data 515 transmitted from the UE 503 after the propagation delay time of T2.

In Embodiment 1, a guard interval required for the IAB node 2 502 to transmit or receive backhaul data and then transmit or receive access data may be calculated as shown in Table 1. In Table 1, TS may be a time required to change a radio frequency (RF) of the IAB node 2 502 from transmit to receive or from receive to transmit. In Table 1, "-" may mean that a guard interval is not necessary because a link and a transmission direction are maintained.

TABLE 1

| From\To | Backhaul DL RX (or Backhaul UL RX) | Backhaul UL TX (or Backhaul DL TX) | Access DL TX | Access UL RX |
|---|---|---|---|---|
| Backhaul DL RX (or Backhaul UL RX) | — | 2T1 + Ts | 2T1 + Ts | 2T1 |
| Backhaul UL TX (or Backhaul DL TX) | Ts − 2T1 | — | 0 | Ts |
| Access DL TX | Ts − 2T1 | 0 | — | Ts |
| Access UL RX | 0 | Ts | Ts | — |

Figure 6:
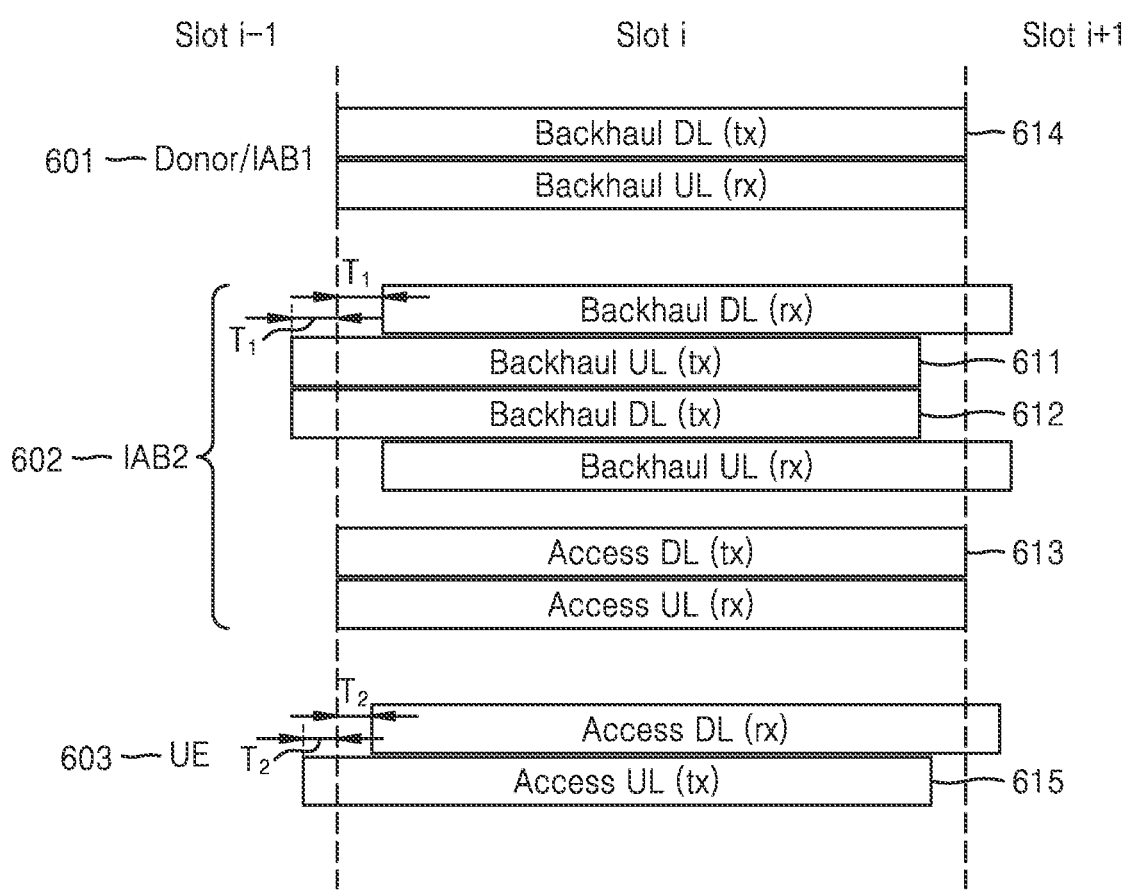
FIG. 6 is a diagram illustrating Embodiment 2 for synchronizing transmission and reception timings of access data and backhaul data in IAB, according to some embodiments.

FIG. 6 is a diagram illustrating Embodiment 2 for synchronizing transmission and reception timings of access data and backhaul data in IAB, according to some embodiments.

In FIG. 6, the description is mainly provided on the assumption that an access link and a backhaul link are configured by TDM, as described with reference to FIG. 2; however, FDM and SDM may also be applied.

Referring to FIG. 6, in Embodiment 2, a backhaul data transmission time point 614 of a donor BS/higher IAB node 1 601 and an access data transmission time 613 of a lower IAB node 2 602 may be synchronized with each other. Also, in Embodiment 2, a backhaul data transmission time point and a backhaul data reception time point of the donor BS/higher IAB node 1 601 may be synchronized with each other.

In Embodiment 2, backhaul data transmission 611 transmitted from the IAB node 2 602 to the donor BS/higher IAB node 1 601 may be received by the donor BS/higher IAB node 1 601 after a propagation delay time of T1, and backhaul data transmission 614 transmitted from the donor BS/higher IAB node 1 601 to the lower IAB node 2 602 may be received by the lower IAB node 2 602 after the propagation delay time of T1. A UE 603 accessing the IAB node 2 602 may receive access data 613 transmitted from the IAB node 2 602 after a propagation delay time of T2, and access data 615 transmitted from the UE 603 may be received by the IAB node 2 602 after the propagation delay time of T2.

In Embodiment 2, a guard interval required for the IAB node 2 602 to transmit or receive backhaul data and then transmit or receive access data may be calculated as shown in Table 2. In Table 2, TS may be a time required to change an RF of the IAB node 2 602 from transmit to receive or from receive to transmit. In Table 2, "-" may mean that a guard interval is not necessary because a link and a transmission direction are maintained. Also, in Table 2, when a value has a negative value such as "−T1", a required guard period may be 0, and it may be determined that a no guard interval is necessary.

TABLE 2

| From\To | Backhaul DL RX (or Backhaul UL RX) | Backhaul UL TX (or Backhaul DL TX) | Access DL TX | Access UL RX |
|---|---|---|---|---|
| Backhaul DL RX (or Backhaul UL RX) | — | 2T1 + Ts | T1 + Ts | T1 |
| Backhaul UL TX (or Backhaul DL TX) | Ts − 2T1 | — | −T1 (=> 0) | Ts − T1 |
| Access DL TX | Ts − T1 | T1 | — | Ts |
| Access UL RX | −Ti (=> 0) | T1 + Ts | Ts | — |

Figure 7:
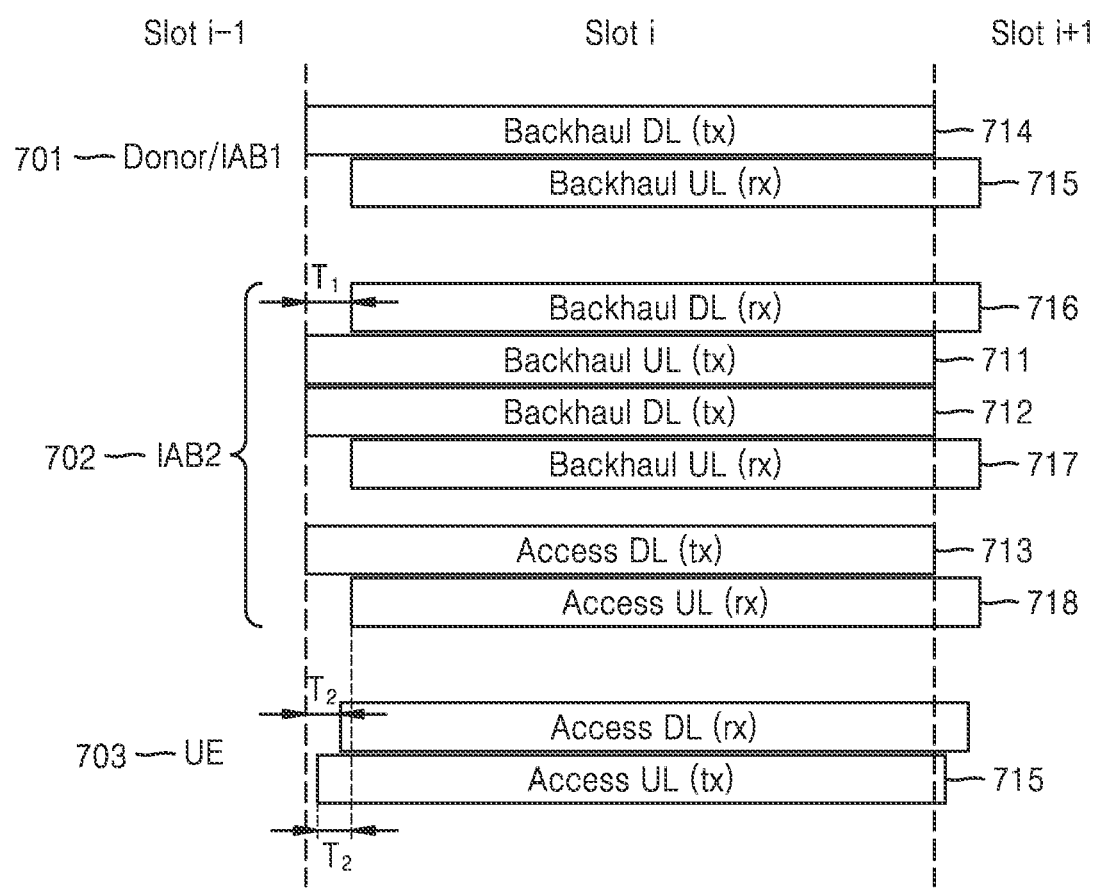
FIG. 7 is a diagram illustrating Embodiment 3 for synchronizing transmission and reception timings of access data and backhaul data in IAB, according to some embodiments.

FIG. 7 is a diagram illustrating Embodiment 3 for synchronizing transmission and reception timings of access data and backhaul data in IAB, according to some embodiments.

In FIG. 7, the description is mainly provided on the assumption that an access link and a backhaul link are configured by TDM, as described with reference to FIG. 2. However, an embodiment may also apply to FDM and SDM.

Referring to FIG. 7, in Embodiment 3, a backhaul data transmission time point 714 of a donor BS/higher IAB node 1 701 may be synchronized with backhaul data transmission time points 711 and 712 and an access data transmission time point 713 of a lower IAB node 2 702. In addition, in Embodiment 3, a backhaul data reception time point 715 of the donor BS/higher IAB node 1 701 may be synchronized with backhaul data reception time points 716 and 717 and an access data reception time point 718 of the lower IAB node 2 702. In addition, in Embodiment 3, a backhaul data transmission time point and a backhaul data reception time point of the donor BS/higher IAB node 1 701 may not be synchronized with each other, unlike Embodiment 1 of FIG. 5 and Embodiment 2 of FIG. 6.

In Embodiment 3, backhaul data transmission 711 transmitted from the IAB node 2 702 to the donor BS/higher IAB node 1 701 may be received by the donor BS/higher IAB node 1 701 after a propagation delay time of T1, and backhaul data transmission 714 transmitted from the donor BS/higher IAB node 1 701 to the lower IAB node 2 702 may be received by the lower IAB node 2 702 after the propagation delay time of T1. A UE 703 accessing the IAB node 2 702 may receive access data 713 transmitted from the IAB node 2 702 after a propagation delay time of T2, and the IAB node 2 702 may receive access data 715 transmitted from the UE 703 after the propagation delay time of T2.

In Embodiment 3, a guard interval required for the IAB node 2 702 to transmit or receive backhaul data and then transmit or receive access data may be calculated as shown in Table 3. In Table 3, TS may be a time required to change an RF of the IAB node 2 702 from transmit to receive or from receive to transmit. In Table 3, "-" may mean that a guard interval is not necessary because a link and a transmission direction are maintained. Also, in Table 3, when a value has a negative value such as "–T1", a required guard period may be 0, and it may be determined that no guard interval is necessary.

TABLE 3

| From\To | Backhaul DL RX (or Backhaul UL RX) | Backhaul UL TX (or Backhaul DL TX) | Access DL TX | Access UL RX |
|---|---|---|---|---|
| Backhaul DL RX (or Backhaul UL RX) | — | T1 + Ts | T1 + Ts | 0 |
| Backhaul UL TX (or Backhaul DL TX) | Ts – T1 | — | 0 | Ts – T1 |
| Access DL TX | Ts – T1 | 0 | — | Ts – T1 |
| Access UL RX | 0 | T1 + Ts | T1 + Ts | — |

When Embodiment 3 of FIG. 7 is applied to FDM or SDM, a guard interval required for the IAB node 2 702 to transmit data and then receive data or to receive data and then transmit data may be calculated as shown in Table 4.

TABLE 4

| From\To | Backhaul DL & UL RX/Access UL RX | Backhaul DL & UL TX/Access DL TX |
|---|---|---|
| Backhaul DL & UL RX/Access UL RX | — | T1 + Ts |
| Backhaul DL & UL TX/Access DL TX | Ts – T1 | — |

Options for securing a guard interval that an IAB node needs to transmit/receive backhaul data and then receive/transmit access data and a guard interval that an IAB node needs to transmit data and then receive data or to receive data and then transmit data according to Embodiments 1, 2, and 3 will be described with reference to FIGS. 8 and 9.

Figure 8:
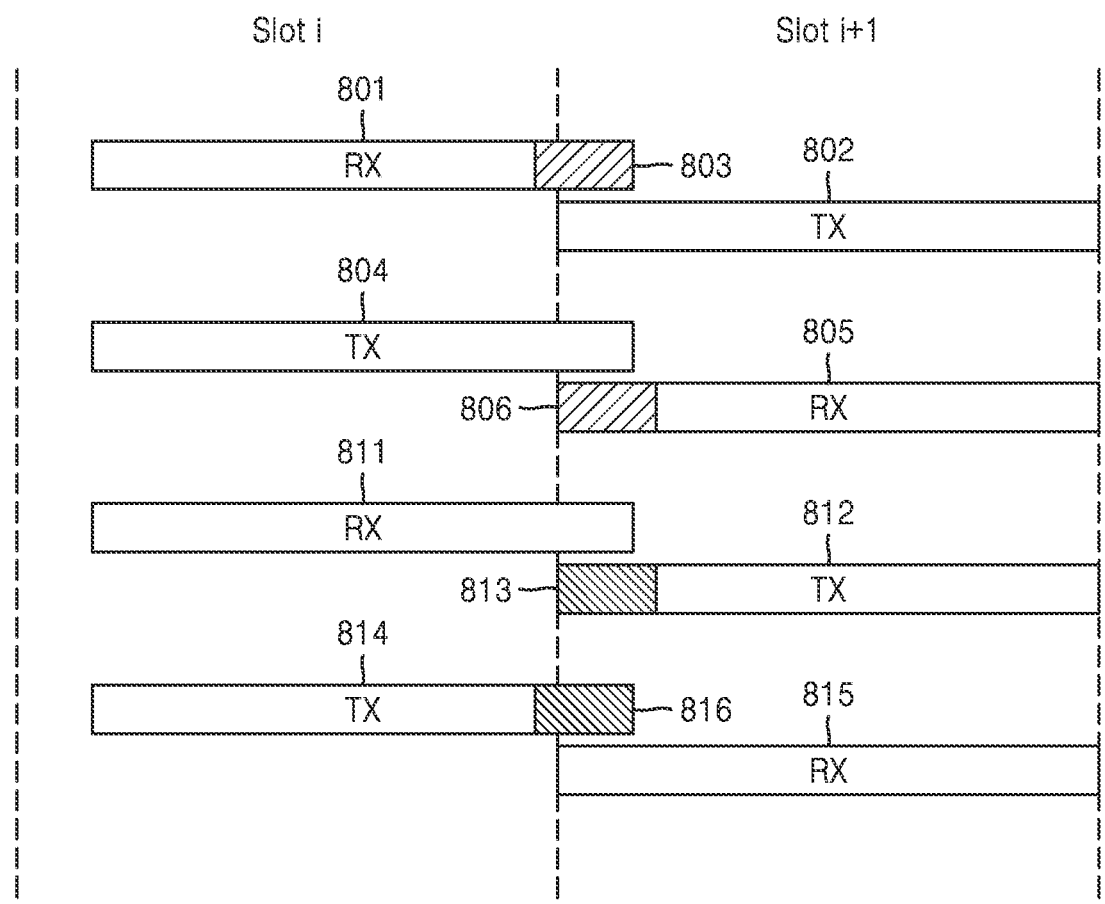
FIG. 8 is a diagram illustrating a first option for securing a guard interval in an IAB node, according to some embodiments.

FIG. 8 is a diagram illustrating a first option for securing a guard interval in an IAB node, according to some embodiments.

As shown in Table 4 of Embodiment 3, in FDM or SDM, which only considers whether an IAB node will transmit (backhaul DL transmission, backhaul UL transmission, or access DL transmission) or receive (back DL reception, backhaul UL reception, or access UL reception), the following two embodiments may be possible.

In a first embodiment, transmission always takes priority in order to secure a guard interval obtained in Table 4. For example, when an IAB node receives, 801, data in a slot i and then transmits, 802, data in a slot i+1, in order to secure a guard interval 803, the IAB node may not receive the last OFDM symbols 803 corresponding to a time period of the guard interval 803 from among data that must be received in the slot I, and may perform a data transmission in the slot i+1.

In addition, for example, when an IAB node transmits, 804, data in the slot i and then receives, 805, data in the slot i+1, in order to secure a guard interval 806, the IAB node may not receive the first OFDM symbols 806 corresponding to a time period of the guard interval 806 from among data that must be received in the slot i, and may perform a data transmission in the slot i until the end.

The first embodiment of the first option may have an advantage in that transmission of a downlink control channel may be guaranteed for backhaul DL transmission and access DL transmission.

In a second embodiment, reception always takes priority in order to secure a guard interval obtained in Table 4. For example, when an IAB node receives, 811, data in the slot i and then transmits, 812, data in the slot i+1, in order to secure a guard interval 813, the IAB node may not receive the first OFDM symbols 813 corresponding to a time period of the guard interval 813 from among data that must be received in the slot i+1, and may perform a data reception in the slot i until the end.

In addition, for example, when an IAB node receives, 814, data in the slot i and then transmits, 815, data in the slot i+1, in order to secure a guard interval 816, the IAB node may not receive the last OFDM symbols 816 corresponding to a time period of the guard interval 816 from among data that must be received in the slot i+1, and may perform a data reception in the slot i+1 from the first OFDM symbol.

The second embodiment of the first option may have an advantage in that reception of an uplink control channel is ensured for backhaul UL reception and access UL reception.

Figure 9:
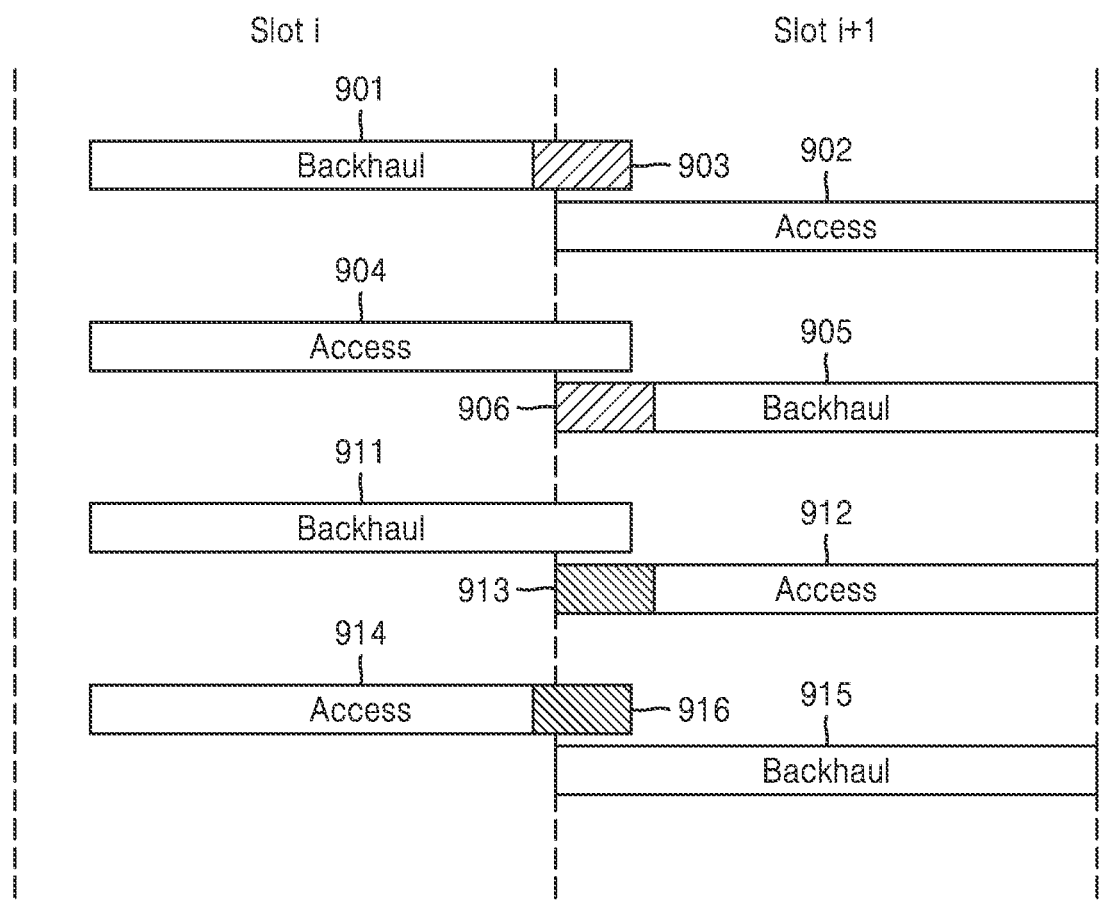
FIG. 9 is a diagram illustrating a second option for securing a guard interval in an IAB node, according to some embodiments.

FIG. 9 is a diagram illustrating a second option for securing a guard interval in an IAB node, according to some embodiments.

In TDM, which only considers whether an IAB node will perform a backhaul link transmission, a backhaul link reception, an access link transmission, or an access link reception, as in Tables 1, 2, and 3 of Embodiments 1, 2, and 3, the following two embodiments may be possible between backhaul link transmission/reception and access link reception/transmission.

In a first embodiment, in order to secure a guard interval obtained in Tables 1, 2, and 3, an access link always takes priority. For example, when an IAB node receives, 901, data in the slot i and then transmits, 902, data in the slot i+1, in order to secure a guard interval 903, the IAB node may not receive the last OFDM symbols 903 of a backhaul link corresponding to a time period of the guard interval 903 from among data that must be received in the slot i, and may perform an access link transmission/reception in the slot i+1 from the first OFDM symbol.

In addition, for example, when an IAB node performs transmission/reception, 904, via an access link in the slot i and then performs transmission/reception, 905, via a backhaul link in the slot i+1, in order to secure a guard interval 906, the IAB node may not receive the first OFDM symbols 906 of a backhaul link corresponding to a time period of the guard interval 906 from among data that must be transmitted/received in the slot i+1, and may perform an access link transmission/reception in the slot i until the end.

The first embodiment of the second option may have an advantage in that a system having a backhaul link of an IAB node may be operated without any influence on a UE transmitting/receiving an access link.

In a second embodiment, a backhaul link always takes priority in order to secure a guard interval obtained in Tables 1, 2, and 3. For example, when an IAB node transmits/receives, 911, a backhaul link in the slot i and then transmits/ receives, 912, an access link in the slot i+1, in order to secure a guard interval 913, the IAB node may not receive the first OFDM symbols 913 of an access link corresponding to a time period of the guard interval 913 from among data that must be transmitted/received in the slot i+1, and may perform a backhaul link transmission/reception in the slot i until the end.

In addition, for example, when an IAB node transmits/receives, 914, an access link in the slot i and then transmits/receives, 915, a backhaul link in the slot i+1, in order to secure a guard interval 916, the IAB node may not receive the last OFDM symbols 913 of the access link corresponding to a time period of the guard interval 916 from among data that must be transmitted/received in the slot i, and may perform a backhaul link transmission/reception in the slot i+1 from the first OFDM symbol.

In the second embodiment of the second option, a resource for minimizing the influence on a UE is arranged in a guard interval through settings of a reserved resource, and thus, the influence of an access link on the UE may be minimized. In addition, transmission/reception of a backhaul link is ensured, and thus, data transmission/reception capacity may increase.

Figure 10:
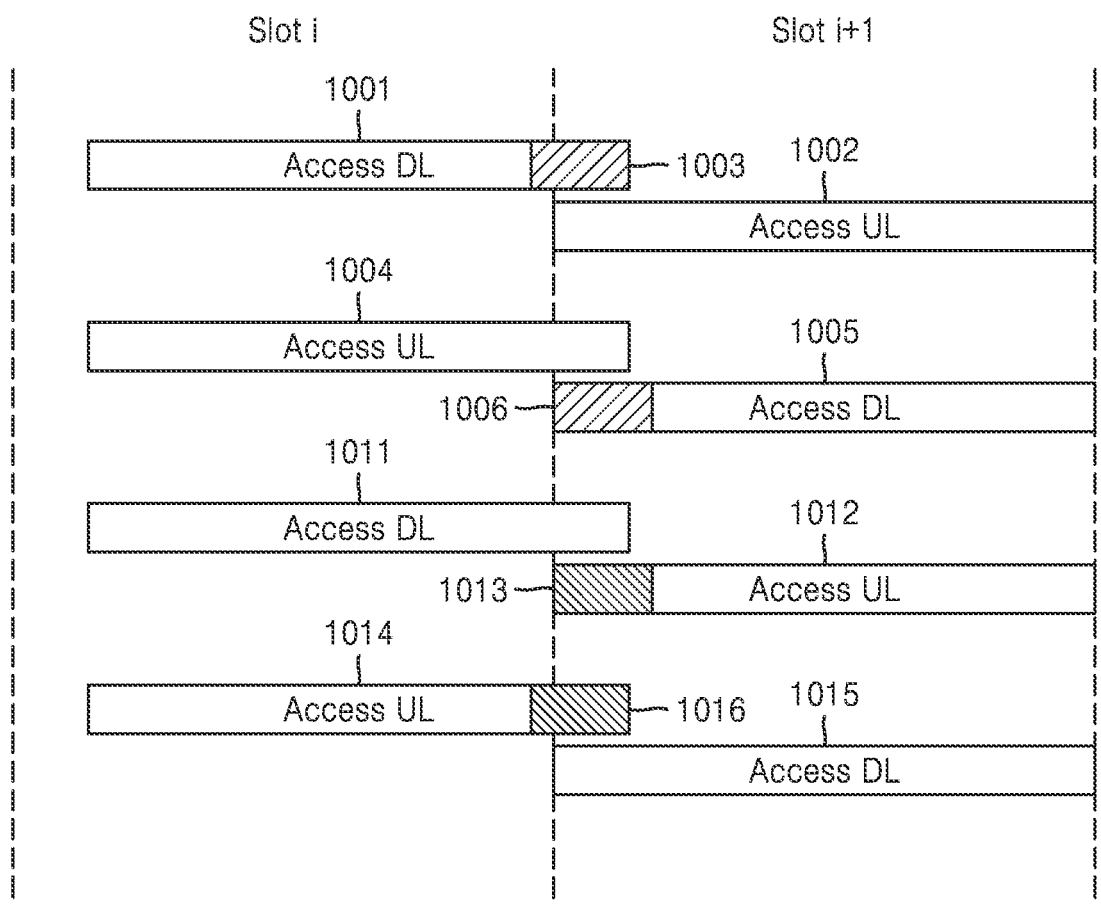
FIG. 10 is a diagram illustrating a third option for securing a guard interval in an IAB node, according to some embodiments.

FIG. 10 is a diagram illustrating a third option for securing a guard interval in an IAB node, according to some embodiments.

In TDM, which only considers whether an IAB node will perform a backhaul link transmission, a backhaul link reception, an access link transmission, or an access link reception, as in Tables 1, 2, and 3 of Embodiments 1, 2, and 3, the following two embodiments may be possible between access DL transmission/reception and access UL reception.

In a first embodiment, an access UL reception always takes priority in order to secure a guard interval obtained in Tables 1, 2, and 3. For example, when an IAB node performs an access DL transmission 1001 in the slot i and then performs an access UL reception 1002 in the slot i+1, in order to secure a guard interval 1003, the IAB node may not receive the last OFDM symbols 1003 of an access DL transmission corresponding to a time period of the guard interval 1003 from among data that must be transmitted in the slot i, and may perform an access UL reception in the slot i+1 from the first OFDM symbol.

In addition, for example, when an IAB node performs an access UL transmission 1004 in the slot i and then performs an access DL reception 1005 in the slot i+1, in order to secure a guard interval 1006, the IAB node may not receive the first OFDM symbols 1006 of the access DL transmission corresponding to a time period of the guard interval 1006 from among data that must be transmitted in the slot i+1, and may perform an access UL reception in the slot i from until the end.

In the first embodiment of option 3, the access UL reception takes priority, and thus, by arranging a resource for minimizing the influence on a terminal in a guard interval through settings of a reserved resource, the influence of an access DL on the UE may be minimized. Also, a system that is optimized for channel feedback of the UE may be operated through an access UL reception of an IAB node without any influence on the UE.

In a second embodiment, an access DL transmission always takes priority in order to secure a guard interval obtained in Tables 1, 2, and 3. For example, when an IAB node performs an access DL transmission 1011 in the slot i and then performs an access UL reception 1012 in the slot i+1, in order to secure a guard interval 1013, the IAB node may not receive the first OFDM symbols 1013 of an access UL reception corresponding to a time period of the guard interval 1013 from among data that must be received in the slot i+1, and may perform an access DL transmission in the slot i until the end.

In addition, for example, when an IAB node performs an access UL reception 1014 in the slot i and then performs an access DL transmission 1015 in the slot i+1, in order to secure a guard interval 1016, the IAB node may not receive the last OFDM symbols 1016 of the access UL reception corresponding to a time period of the guard interval 1016 from among data that must be received in the slot i, and may perform an access DL transmission in the slot i+1 from the first OFDM symbol.

The second embodiment of the option 3 may have an advantage in that the effect of not fully performing the access UL reception may be solved by implementing the BS of the IAB node, and that the influence on the UE from the access DL reception may be eliminated.

Figure 11:
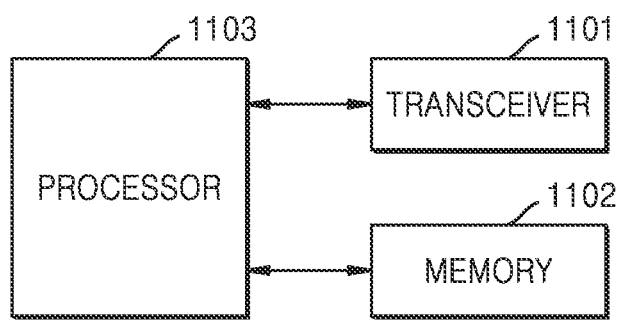
FIG. 11 is a diagram illustrating a configuration of a UE, according to some embodiments.
Figure 12:
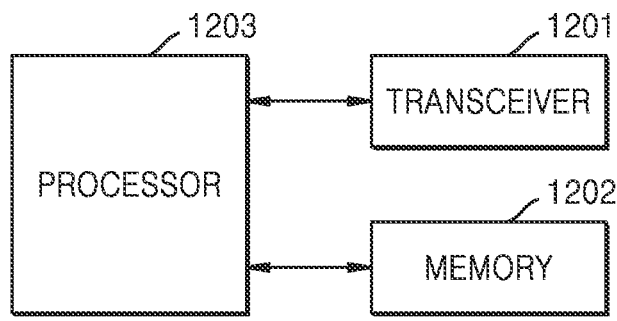
FIG. 12 is a diagram illustrating a configuration of a BS, according to some embodiments.
Figure 13:
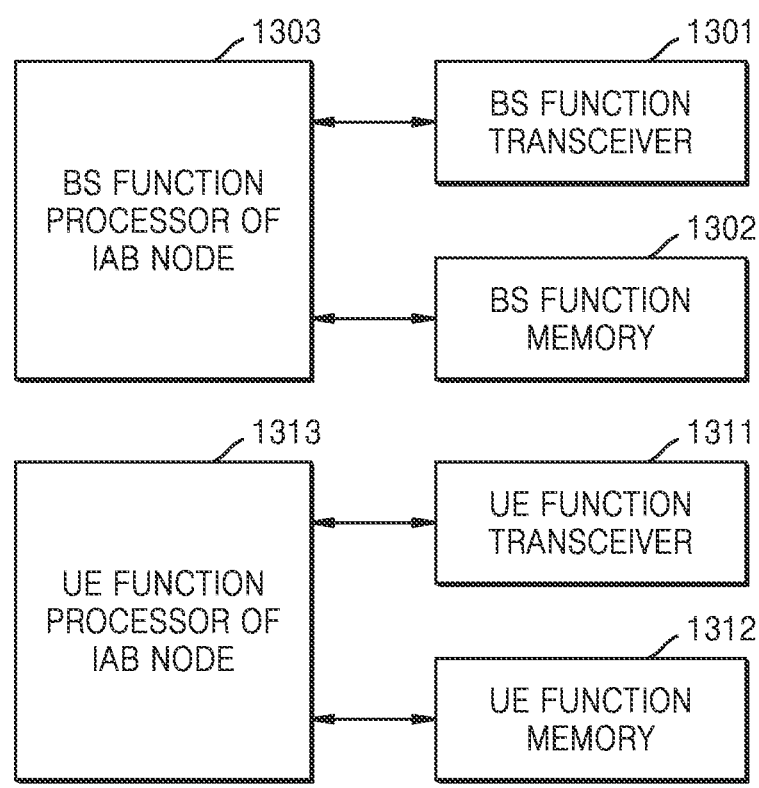
FIG. 13 is a diagram illustrating a configuration of an IAB node, according to some embodiments.

Structures of a UE, a BS, and an IAB node capable of performing embodiments of the disclosure are shown in FIGS. 11, 12, and 13, respectively. According to some embodiments of the disclosure, in a 5G communication system, when performing a transmission/reception to/from an IAB node via a backhaul link or an access link, a transmitter, a receiver, and a processor of devices of a BS, a UE, and an IAB node may each operate to carry out a transmission/reception scheme for a BS (a donor BS) performing a transmission/reception to/from an IAB node via a backhaul link through mmWave and a UE transmitting/receiving to/from an IAB node via an access link FIG. 11 is a block diagram illustrating a structure of a UE, according to some embodiments of the disclosure. As shown in FIG. 11, a UE may include a transceiver 1101, a memory 1102, and a processor 1103. However, the elements of the UE are not limited to the above example. For example, the UE may include more elements or fewer elements than the above elements. Further, the transceiver 1101, the memory 1102, and the processor 1103 may be implemented in the form of one chip.

The transceiver 1101 may transmit/receive signals to/from a BS. Here, the signals may include control information and data. For this, the transceiver 1101 may include, for example, an RF transmitter for up-converting and amplifying a frequency of a transmitted signal and an RF receiver for low-noise-amplifying and down-converting a frequency of a received signal. However, this is merely an embodiment of the transceiver 1101, and the elements of the transceiver 1101 are not limited to the RF transmitter and the RF receiver.

The transceiver 1101 may receive a signal through a radio channel and output the received signal to the processor 1103, and transmit a signal output from the processor 1103 through the radio channel.

The memory 1102 may store programs and data necessary for the operation of the UE. Also, the memory 1102 may store control information or data included in the signals obtained by the UE. The memory 1102 may be a storage medium, such as ROM, RAM, a hard disk, a CD-ROM, and a DVD, or a combination of storage media.

The processor 1103 may control a series of processes such that the UE operates according to the above-described embodiment of the disclosure. For example, the processor 1103 may control an access link transmission/reception to/from an IAB node according to an embodiment of the disclosure.

FIG. 12 is a block diagram illustrating a structure of a BS (a donor BS), according to some embodiments of the disclosure. As shown in FIG. 12, the BS may include a transceiver 1201, a memory 1202, and a processor 1203. However, the elements of the BS are not limited to the above example. For example, the BS may include more elements or fewer elements than the above elements. Further, the transceiver 1201, the memory 1202, and the processor 1203 may be implemented in the form of one chip.

The transceiver 1201 may transmit/receive signals to/from the UE. Here, the signals may include control information and data. For this, the transceiver 1201 may include, for example, an RF transmitter for up-converting and amplifying a frequency of a transmitted signal and an RF receiver for low-noise-amplifying and down-converting a frequency of a received signal. However, this is merely an embodiment of the transceiver 1201, and the elements of the transceiver 1201 are not limited to the RF transmitter and the RF receiver.

The transceiver 1201 may receive a signal through a radio channel and output the received signal to the processor 1203, and transmit a signal output from the processor 1203 through the radio channel.

The memory 1202 may store programs and data necessary for the operation of the UE. Also, the memory 1202 may store control information or data included in the signals obtained by the UE. The memory 1202 may be a storage medium, such as ROM, RAM, a hard disk, a CD-ROM, and a DVD, or a combination of storage media.

The processor 1203 may control a series of processes such that the BS operates according to the above-described embodiment of the disclosure. For example, a backhaul link transmission/reception and an access link transmission/reception, etc. to/from an IAB node according to an embodiment of the disclosure may be controlled.

FIG. 13 is a diagram illustrating a structure of an IAB node, according to some embodiments of the disclosure. As shown in FIG. 13, an IAB node according to an embodiment of the disclosure may include a BS function transceiver 1301, a BS function memory 1302, and a BS function processor 1303 of the IAB node for performing a transmission/reception to/from a lower IAB node via a backhaul link.

In addition, the IAB node may include a UE function transceiver 1311, a UE function memory 1312, and a UE function processor 1313 for transmitting and receiving a higher layer signal before initially accessing the higher IAB node and the donor BS and performing transmission and reception via a backhaul link, and for performing transmission and reception to and from the higher IAB node and the donor BS via the backhaul link.

However, the elements of the IAB node are not limited to the above example. For example, the IAB node may include more elements than the aforedescribed elements or may include fewer elements than the aforedescribed elements. Moreover, the BS function transceiver 1301, the BS function memory 1302, the BS function processor 1303, the UE function transceiver 1311, the UE function memory 1312, and the UE function processor 1313 may be implemented in the form of one chip.

The BS function transceiver 1301 may transmit/receive signals to/from a lower IAB node and a UE. Here, the signals may include control information and data. For this purpose, the BS function transceiver 1301 may include an RF transmitter for up-converting and amplifying a frequency of a transmitted signal and an RF receiver for low-noise-amplifying and down-converting a frequency of a received signal. However, this is merely an embodiment of the BS function transceiver 1301, and the elements of the BS function transceiver 1301 are not limited to the RF transmitter and the RF receiver.

In addition, the BS function transceiver 1301 may receive a signal through a radio channel, output the received signal to the BS function processor 1303, and transmit a signal output from the BS function processor 1303 through the radio channel.

The BS function memory 1302 may store programs and data necessary for the operation of the UE. Also, the BS function memory 1302 may store control information or data included in the signals obtained by the UE. The BS function memory 1302 may be a storage medium, such as ROM, RAM, a hard disk, a CD-ROM, and a DVD, or a combination of storage media.

The BS function processor 1303 of the IAB node may control a series of processes such that the IAB node operates like a BS according to the above-described embodiment of the disclosure. For example, the BS function processor 1303 may control a backhaul link transmission/reception to/from a lower IAB node and an access link transmission/reception to/from a UE according to an embodiment of the disclosure.

The UE function transceiver 1311 may transmit/receive signals to/from a Donor BS and a higher IAB node. Here, the signals may include control information and data. For this purpose, the UE function transceiver 1311 may include, for example, an RF transmitter for up-converting and amplifying a frequency of a transmitted signal and an RF receiver for low-noise-amplifying and down-converting a frequency of a received signal. However, this is merely an embodiment of the UE function transceiver 1311, and the elements of the UE function transceiver 1311 are not limited to the RF transmitter and the RF receiver.

In addition, the UE function transceiver 1311 may receive a signal through a radio channel, output the received signal to the UE function processor 1313, and transmit a signal output from the UE function processor 1313 through the radio channel.

The UE function memory 1312 may store programs and data necessary for the operation of the UE. Also, the UE function memory 1312 may store control information or data included in the signals obtained by the UE. The UE function memory 1312 may be a storage medium, such as ROM, RAM, a hard disk, a CD-ROM, and a DVD, or a combination of storage media.

The UE function processor 1313 of an IAB node may control a series of processes such that a lower IAB node operates as a UE for data transmission/reception to/from a donor BS and a higher IAB node. For example, the UE function processor 1313 of the IAB node may control backhaul link transmission/reception to/from the Donor BS and the higher IAB node according to an embodiment of the disclosure.

Several embodiments of the disclosure have been described, but a person of ordinary skill in the art will understand and appreciate that various modifications can be made without departing the scope of the disclosure. Thus, it will be apparent to those of ordinary skill in the art that the disclosure is not limited to the embodiments of the disclosure, which have been provided only for illustrative purposes. Also, the embodiments may be combined with each other as required.

In addition, embodiments of the disclosure have been described and illustrated in the present specification and drawings. Although certain terms are used herein, this is merely used in a general sense to easily describe the technical idea of the disclosure and to help understanding of the disclosure, and is not intended to limit the scope of the disclosure. It will be obvious to those of ordinary skill in the art that other modifications based on the technical idea of the disclosure may be made.

The invention claimed is:

1. An integrated access and backhaul (IAB) node for transmitting or receiving data in a wireless communication system, the IAB node comprising:
   a transceiver configured to operate in a transmission mode or a reception mode; and
   at least one processor connected to the transceiver and configured to:
      in case of performing a transition between the transmission mode and the reception mode, determine, based on a priority, whether to complete transmission or reception of first data in a guard interval; and
      control a start of reception or transmission of second data based on the guard interval and a time point at which the transmission or reception of the first data is completed, and
      wherein the guard interval includes a time at which a transmission or reception interval of the first data and a transmission or reception interval of the second data overlap each other and a time for the transition between the transmission mode and the reception mode.

2. The IAB node of claim 1, wherein the priority is configured such that the transmission mode takes priority over the reception mode.

3. The IAB node of claim 2, wherein the at least one processor is further configured to:
   determine, according to the priority, to complete the reception of the first data before a start of the guard interval, except for some symbols of the first data corresponding to the guard interval from among the first data; and
   after a time for transition from the reception mode to the transmission mode from a time point at which the reception of the first data is completed, control the start of the transmission of the second data.

4. The IAB node of claim 2, wherein the at least one processor is further configured to:
   determine to complete the transmission of the first data, according to the priority; and
   control a start of reception of other symbols of the second data except for some symbols of the second data corresponding to the guard interval from among the second data.

5. The IAB node of claim 1, wherein the priority is configured such that the reception mode takes priority over the transmission mode.

6. The IAB node of claim 5, wherein the at least one processor is further configured to:
   determine to complete the reception of the first data, according to the priority; and
   control a start of transmission of other symbols of the second data except for some symbols of the second data corresponding to the guard interval from among the second data.

7. The IAB node of claim 1, wherein the at least one processor is further configured to:
   determine, according to the priority, to complete the transmission of the first data before a start of the guard interval, except for some symbols of the first data corresponding to the guard interval from among the first data; and
   after a time for transition from the reception mode to the transmission mode from a time point at which the transmission of the first data is completed, control the start of the reception of the second data.

8. The IAB node of claim 1, wherein the first data and the second data are transmitted or received via a backhaul link or an access link.

9. A method, performed by an integrated access and backhaul (IAB) node, of transmitting or receiving data in a wireless communication system, the method comprising:
   in case of performing a transition between a transmission mode and a reception mode, determining, based on a priority, whether to complete a transmission or reception of first data in a guard interval; and
   controlling a start of reception or transmission of second data based on the guard interval and a time point at which the transmission or reception of the first data is completed, and
   wherein the guard interval includes a time at which a transmission or reception interval of the first data and a transmission or reception interval of the second data overlap each other and a time for the transition between the transmission mode and the reception mode.

10. The method of claim 9, wherein the priority is configured such that the transmission mode takes priority over the reception mode.

11. The method of claim 10, wherein the determining of whether to complete the transmission or reception of the first data in the guard interval comprises determining, according to the priority, to complete the reception of the first data before a start of the guard interval, except for some symbols of the first data corresponding to the guard interval from among the first data, and
   wherein the controlling of the start of the reception or transmission of the second data comprises, after a time for transition from the reception mode to the transmission mode from a time point at which the reception of the first data is completed, controlling the start of the transmission of the second data.

12. The method of claim 10, wherein the determining of whether to complete the transmission or reception of the first data in the guard interval comprises determining to complete the transmission of the first data, according to the priority, and
   wherein the controlling of the start of the reception or transmission of the second data comprises controlling a start of reception of other symbols of the second data except for some symbols of the second data corresponding to the guard interval from among the second data.

13. The method of claim 9, wherein the priority is configured such that the reception mode takes priority over the transmission mode.

14. The method of claim 13, wherein the determining of whether to complete the transmission or reception of the first data in the guard interval comprises determining to complete the reception of the first data, according to the priority, and
   wherein the controlling of the start of the reception or transmission of the second data comprises controlling a start of transmission of other symbols of the second data except for some symbols of the second data corresponding to the guard interval from among the second data.

15. The method of claim 13, wherein the determining of whether to complete the transmission or reception of the first data in the guard interval comprises determining, according to the priority, to complete the transmission of the first data before a start of the guard interval, except for some symbols of the first data corresponding to the guard interval from among the first data, and wherein the controlling of the start of the reception or transmission of the second data comprises, after a time for transition from the reception mode to the transmission mode from a time point at which the transmission of the first data is completed, controlling the start of the reception of the second data.

* * * * *